(No Model.)  
5 Sheets—Sheet 1.
C. H. SCHNEIDER.
APPARATUS FOR PRODUCING AMMONIA.
No. 325,771.  
Patented Sept. 8, 1885.
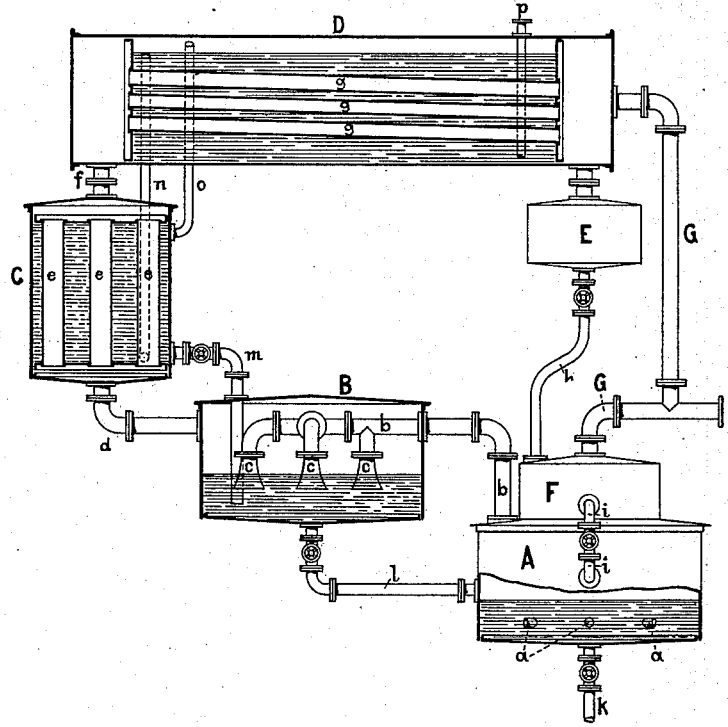

(No Model.) 5 Sheets—Sheet 2.

C. H. SCHNEIDER.
APPARATUS FOR PRODUCING AMMONIA.

No. 325,771. Patented Sept. 8, 1885.

Witnesses:
Inventor.
Carl H. Schneider
by Marcellus Bailey
his Attorney (No Model.) 5 Sheets—Sheet 3.
C. H. SCHNEIDER.
APPARATUS FOR PRODUCING AMMONIA.
No. 325,771. Patented Sept. 8, 1885.
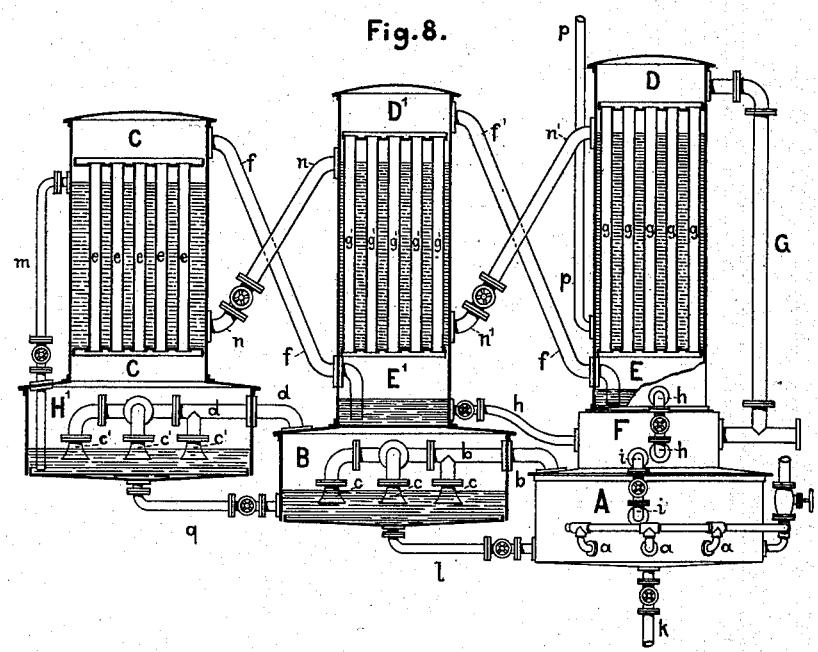
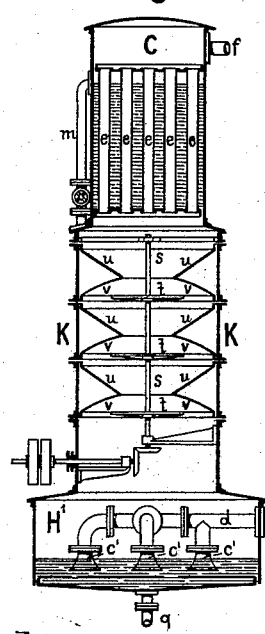
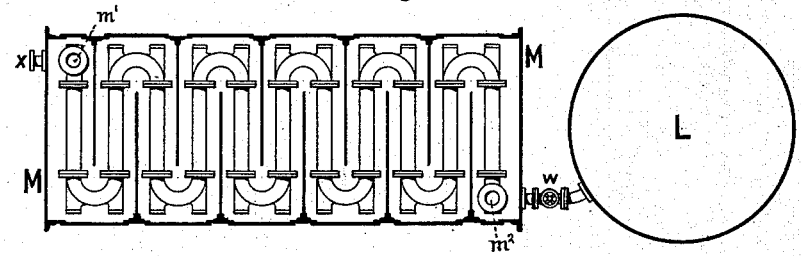
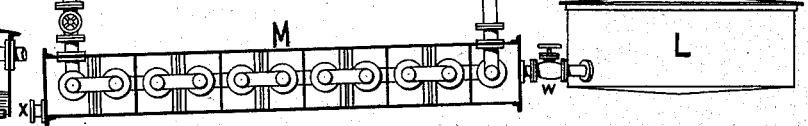
Witnesses:
Inventor:
Carl H. Schneider (No Model.) 5 Sheets—Sheet 4.

C. H. SCHNEIDER.
APPARATUS FOR PRODUCING AMMONIA.

No. 325,771. Patented Sept. 8, 1885.

Witnesses:
Inventor:
Carl H. Schneider
by Marcellus Bailey
his attorney

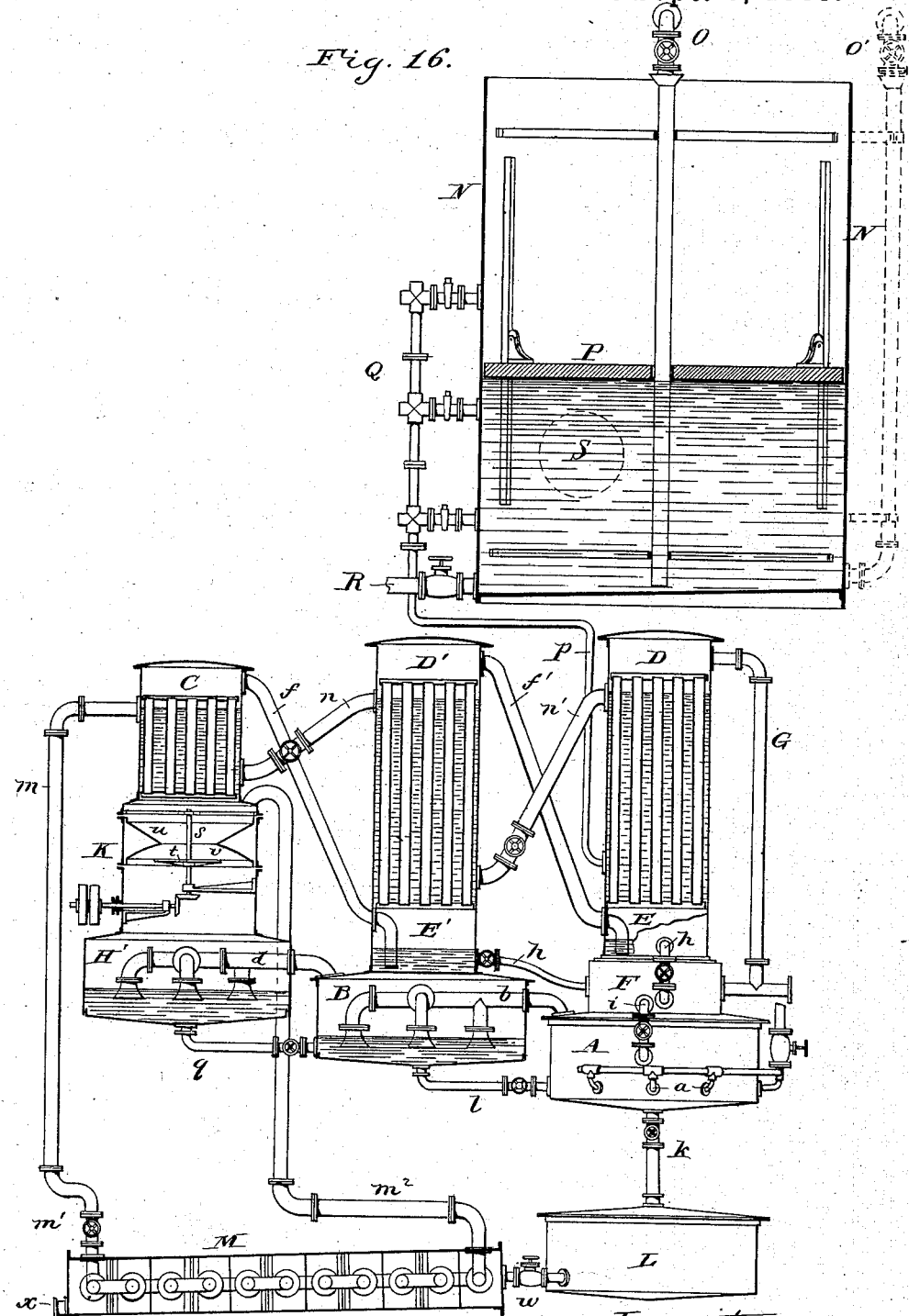

UNITED STATES PATENT OFFICE.

CARL HEINRICH SCHNEIDER, OF FREIBURG, GERMANY, ASSIGNOR TO BUHL & KELLER, OF SAME PLACE.

APPARATUS FOR PRODUCING AMMONIA.

SPECIFICATION forming part of Letters Patent No. 325,771, dated September 8, 1885.

Application filed October 11, 1883. (No model.) Patented in Germany May 31, 1882, No. 21,252.

*To all whom it may concern:*

Be it known that I, CARL HEINRICH SCHNEIDER, residing in Freiburg, in the Grand Duchy of Baden, Germany, have invented new and useful Improvements in Apparatus for Producing Ammonia, for which I have obtained patent in Germany, No. 21,252, of May 31, 1882, of which the following is a specification.

My invention relates to the production of ammonia from ammoniacal liquors, such as are obtained in the manufacture of coal-gas, in the treatment of bones, from fecal matter, &c., and its object is to render the apparatus to be used for this purpose more efficient and economical, to reduce their liability to be impeded in their operation by sediments from the liquors, and to allow them to be cleaned with greater facility.

The invention also comprises apparatus for preparatory treatment of crude ammoniacal liquors previous to their distillation. According to the quantity of liquor to be worked in a certain time, to its titre in ammonia, and to its other properties, the different parts of the apparatus are differently arranged.

During the distilling process the liquor to be treated is contained in the distilling vessels A and B, where, while being mixed with lime or other suitable substances, it is heated by steam, acting either directly or through the walls of pipes, or by means of hot air, or by an ordinary grate-fire. In order to simplify the description, I shall refer at first to the method of heating by the direct introduction of steam only.

Figure 6:
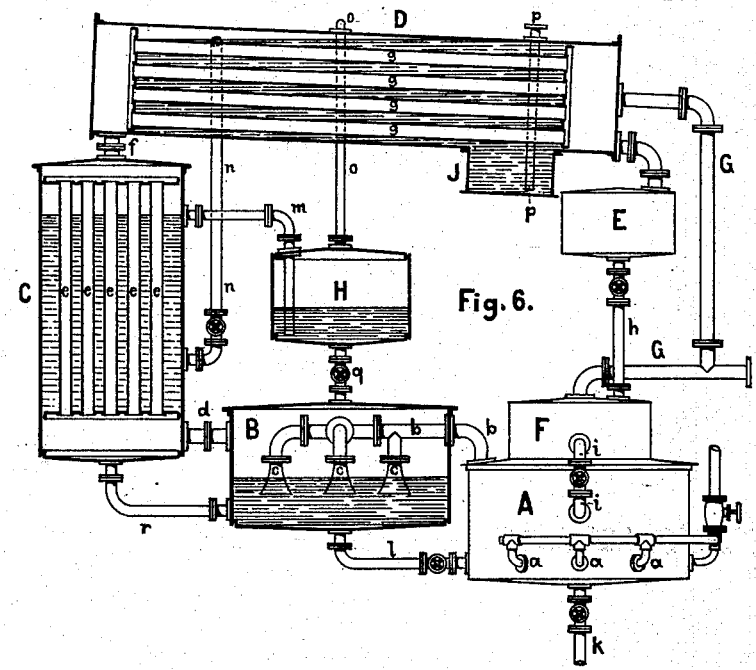
Figure 7:
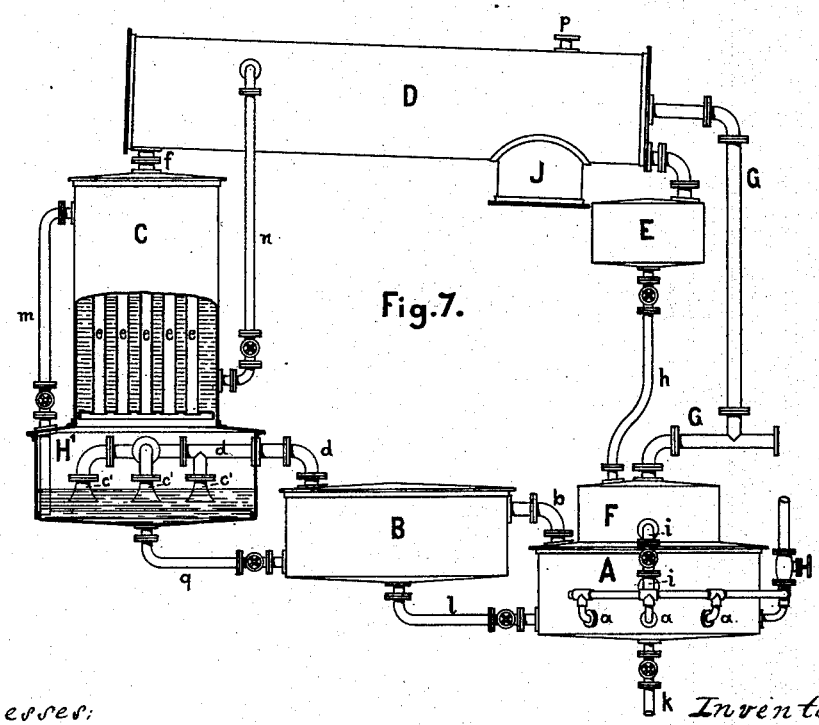
Figure 13:
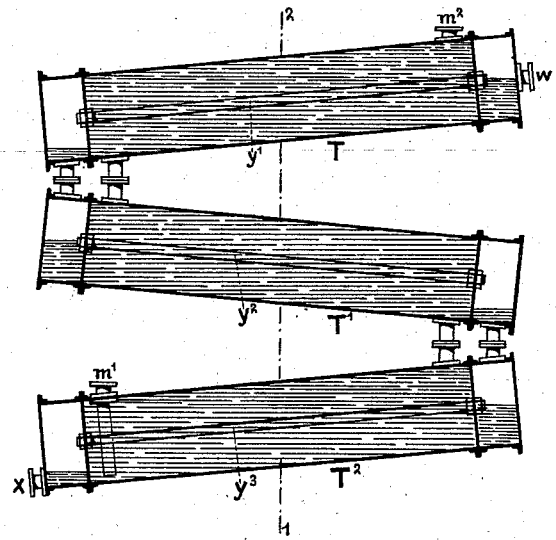
Figure 14:
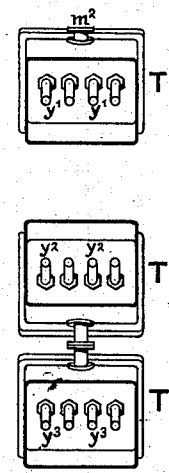
Figure 12:
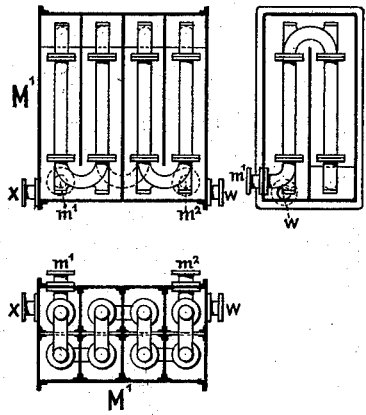
Figure 15:
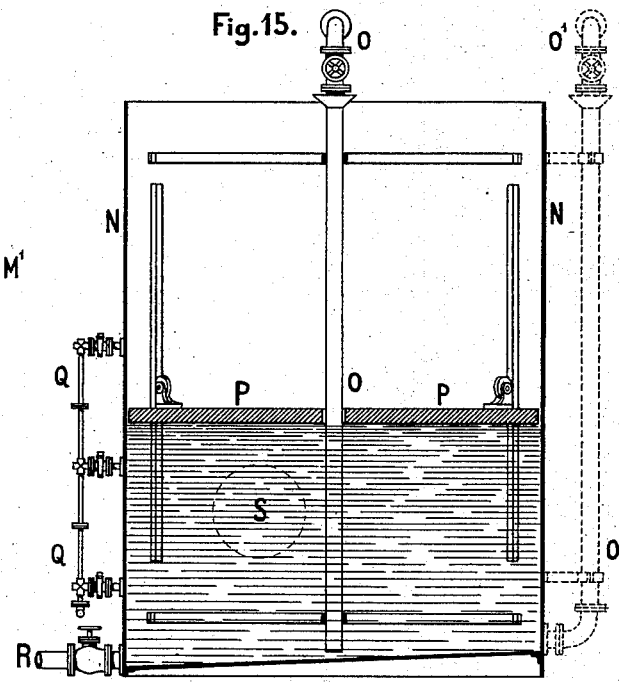

The invention is represented on the annexed five sheets of drawings. Figure 1 is a sectional view of a small distilling apparatus. Figs. 2, 3, and 4 are horizontal sections through the vessels A, B, and C, respectively. Fig. 5 is a transverse section through the part D. Fig. 6 is a like apparatus of larger capacity; Fig. 7, an apparatus of still greater working power; Fig. 8, an apparatus with modified arrangement of parts. Fig. 9 shows a rotating apparatus introduced between the parts C and H' of Figs. 7 and 8. Fig. 10 is a sectional plan, and Fig. 11 a side view, of a liquor-heater. Fig. 12 shows a modified heater in three different sectional views. Fig. 13 is another modification of heater in sectional elevation, while Fig. 14 is a transverse section thereof according to line 1 2, Fig. 13. Fig. 15 is a sectional elevation of a separating or settling tank for fecal matter, and Fig. 16 is a view, partly in section, of one form of the entire apparatus.

Into the distilling-vessel A, Figs. 1 and 2, which contains the liquor to be treated, steam is admitted by the branch pipes *a*. The mixture of vapor and ammonia thereby evolved from the liquor is conducted by the pipe *b* to the second distilling-vessel, B, where it passes out by bell-mouthed branches *c* below the surface of the liquor, this liquor being thus also heated so as to evolve vapor and ammonia, which are conducted by the pipe *d* to the dephlegmator C. The bell-mouthed branches *c* are shown in Fig. 3 in plan. Their number, which, according to the drawings, is four, may, however, be varied. They dip to a certain depth into the liquor, so that the latter will be kept in constant commotion by the vapors emanating from the branches, the disengagement of ammonia being thereby promoted.

The dephlegmator C, Figs. 1 and 4, consists of a system of vertical tubes, *e*, surrounded by crude and cold ammoniacal liquor, and in which a part of the aqueous vapors entering from B by the pipe *d* are condensed, so that they will flow back into B, while the rest, together with the ammonia, passes by the pipe *f* to the condenser D. In this manner a considerable quantity of water is separated, which, in apparatus of the old system, is apt to act unfavorably upon the further progress of the distilling process, and which may even render the same impossible.

The condenser D is composed of a number of tubes, *g*, Figs. 1 and 5, also surrounded by cold liquor to be worked, so that a part of the vapors passing through the tubes will be condensed to water containing ammonia, which, on account of the downward inclination of the tubes in the direction of the vapor-current, will flow in the receiver E, whereas the uncondensed ammoniacal vapors pass through the pipe G either to a receptacle or tank containing sulphuric or muriatic acid, in order to combine therewith to sulphate or muriate of ammonia, or to a receiver, where they are absorbed by water. The aqueous solution of ammonia which has collected in the receiver E during the working of one charge is at the end thereof drawn off by the pipe $h$ to the rectifier F, which is placed with its bottom on the distilling-vessel A, and which is heated by the same to such a degree that vapors of ammonia only, but no watery vapors, will be evolved from the liquid in F. The ammonia vapors pass through the tube G to the acid-containing tank. The liquid, after having been freed from ammonia, is drawn off from F through the pipe $i$ to the distilling-vessel A, in order that it may again participate in the distilling operation. When all ammonia has been expelled from the liquor contained in A, a charge is finished. The vessel is emptied through the pipe $k$, and subsequently the contents of the vessel B are allowed to flow through pipe $l$ into A, while B is filled by pipe $m$ from the dephlegmator C with liquor having previously been warmed therein. The said pipe $m$ is attached to the dephlegmator C in such a manner that only so much liquor will flow from the latter into the vessel B as is to be worked in one charge. The dephlegmator is refilled from the condenser by the pipe $n$, communicating with the latter at such a height as to allow only the upper and comparatively warm layers to flow off into the dephlegmator. $o$ is a pipe by which communication is established between the top of the liquid-space of C and the upper part of D in order to let air escape from C to D while C is being filled. The condenser is replenished through the pipe $p$ by means of a pump, or from an elevated reservoir, an overflow-pipe, which is, however, not shown in the drawings, serving to limit with certainty the height of the liquid.

The described apparatus is adapted for distilling in twenty-four hours from three to four cubic meters (six hundred and sixty to eight hundred and eighty gallons) of liquor whose titre in ammonia is considerable, and which contains but little foreign matter apt to form sediments. In case larger quantities of liquor (five to six cubic meters in twenty-four hours) are to be treated, and when this liquor contains substances which form deposits of mud, the apparatus is constructed as in Fig. 6. The condenser thereof is inclined downward toward its delivery end, and it is provided at its lowest part with a mud-collector, I, in which the sediments may gather without covering the condenser-tubes $g$. Moreover, the apparatus is arranged for continuous feed. From a reservoir placed at a suitable elevation, or by means of a pump, liquor is continuously introduced into the condenser D, whence the upper and warmer layers flow by the pipe $n$ to the dephlegmator C, and from there again the warmer layers by the pipe $m$ to the collecting-vessel H. This vessel is connected by an air-pipe, $o$, with the condenser above the level of the liquid contained therein, and by a pipe, $q$, with the distilling-vessel B. By means of a suitable adjustment of the cock in the pipe $n$ the feed may be so regulated that during the distillation of a charge the quantity of liquor to be worked in one charge will collect in the vessel H. The admission of liquor may, however, be stopped when required by closing the cock in the pipe $n$. At the end of the working of a charge the contents of the vessel H are drawn off by the pipe $q$ to the vessel B. The pipe $r$ conducts the water proceeding from the condensation of vapors in the dephlegmator back to the vessel B. In all other respects the arrangement of the apparatus is the same as that of the one represented by Fig. 1. In case still larger quantities (seven to eight cubic meters in twenty-four hours) are to be worked, it is advantageous to let the liquor collecting in the vessel H participate in the distillation. For this purpose the said vessel is combined with the dephlegmator C, as shown in Fig. 7, where the vessel is marked H', and to the pipe $d$ are attached the bell-shaped branches $c'$, dipping into the liquor in H', and operating in the same manner as the like branches in the vessel B. For the rest the action of the apparatus is exactly the same as that of the one shown by Fig. 6.

When liquors are to be worked from which a considerable quantity of sediments separates out, these sediments are very liable to impede the operation of the condenser when arranged as described. In this case I apply the condenser represented by Fig. 8, and which consists of two parts, D and D', arranged vertically above the distilling-vessels. The course of the process in this apparatus is as follows: The vapors issuing from the dephlegmator C by the pipe $f$ enter into the lower part of the condenser D'. Upon rising in the tubes $g'$ they are partly condensed to liquid, which flows back to the receiver E', while the remainder passes through the pipe $f'$ to the condenser D, where the condensed portion collects in the receiver E, the vapors then yet remaining being conducted by the pipe G to the acid-containing tank. The liquor collecting in the receivers E and E' contains much ammonia, and as the same is moderately heated by the vapors entering through the pipes $f'$ and $f$, as well as by the distilling-vessels below them, it will constantly emit ammoniacal vapors. At the end of the working of a charge the liquor is drawn off from the receivers E and E' by means of the pipes $h$ and $h'$ to the rectifier F, where its distillation is proceeded with in the manner already described. The crude liquor arrives by the pipe $p$ in the condenser D, whence the upper and warmer layers flow by the pipe $n'$ to the condenser D', from there by the pipe $n$ to the dephlegmator C, to be subsequently conducted in the manner hereinbefore described to the collecting-vessel H'. The remaining part of the arrangement of the apparatus (Fig. 8) is precisely the same as in the foregoing ones.

If the quantity of liquor is yet more considerable than has hitherto been assumed—say, from eight to ten cubic meters in twenty-four hours—and if the same is comparatively weak of ammonia, a centrifugal disperser, K, is placed between the collecting-vessel H' and the dephlegmator C. The liquor flowing by the pipe $m$ from the dephlegmator C runs on the funnel $u$ and thence on the disk $t$, which, being fixed with several other like disks to a shaft, $s$, and quickly rotated together with the latter, scatters the liquor about. It is thereupon conducted by the funnel $u$ to the second disk $t$, and so on until, after having passed all the disks, it collects in the vessel H'. At the same time the vapors rising from H' traverse the thin films of liquor and deprive the same of ammonia. The plates or fillings $v$, arranged below the funnels, serve to conduct the rising vapors toward the openings of the funnels.

For working a still greater quantity of weak liquor, the number of distilling-vessels is increased by inserting between the vessels A and B one or two vessels of the same construction as B, while, on the other hand, the apparatus is provided with a liquor heater or economizer. This heater is shown in different arrangements in Figs. 10 to 14. The liquor drawn off at the end of a charge from the distilling-vessel A runs into a mud-vessel, L, Figs. 10 and 11, and thence passes by the pipe $w$ into the shell or box of the heater M, where it circulates in the manner shown by the drawings toward the discharge-pipe $x$. By the cock in the pipe $w$ the flow of the liquor from L can be so regulated that this vessel will be gradually emptied during the working of a charge.

In the box of M there is a tubular conduit, $m'$ $m^2$, which forms a prolongation of the pipe $m$ running from the dephlegmator C to the collecting-vessel H'. The liquor issuing from C is introduced at $m'$, Fig. 11, into the heater, circulates through the same, is heated by the liquor from the vessel L, and leaves the heater at $m^2$ to be conducted to the collector H', Figs. 6, 7, or 8, or to the centrifugal disperser K, Fig. 9.

Instead of the nearly-horizontal heater shown in Figs. 10 and 11, the modified apparatus, Fig. 12, with vertical tubes, may be employed. The course of the liquor to be heated and of the hot liquor is the same as in the arrangement described first.

Another modification is shown by Fig. 13, in sectional elevation, and by Fig. 14 in transverse section, according to line 1 2, Fig. 13. The liquor coming from the vessel L and entering by the pipe $w$ collects at 1, flows through the pipes $y'$, passes from the box T to T', collects at 2, flows through the pipes $y^2$, &c., and leaves the heater at $x$. The liquor to be heated runs from the dephlegmator at $m'$ into the box $T^2$ of the heater, passes hereafter into the boxes T' and T, and is conducted from the latter at $m^2$ by a pipe to the collecting-vessel H, Fig. 6, or H', Figs. 7 and 8, or to the centrifugal disperser K, Fig. 9. The described arrangements of heaters are strictly carried out on the principle of counter-currents. Their advantage over other apparatus for the same purpose is that they may be more readily cleaned than the latter, and that in the arrangements of Figs. 10, 11 and 13, 14 the liquor to be worked always moves in an upward direction, so that the vapors which may be formed will easily find an egress into the collecting-vessel H or H'.

The liquor obtained from gas-works or from the treatment of bones, &c., ordinarily requires no special preparation for the distilling process. The same may be conducted directly from a storage-reservoir into the condenser. In case, however, ammonia is to be extracted from fecal substances, these must previously be clarified by separating the solid parts from the liquid ones. For this purpose the clarifying-tank represented by Fig. 15 is to be used. The fresh excrements taken from the privies are defecated in a special reservoir by means of ferrous sulphate, sulphate of zinc, alum, chloride of zinc or iron, lime, or other suitable chemicals, and hereupon mixed with any substance adapted to promote the clarification, such as sulphate of alumina and others, whereupon they are conveyed, by means of a pump or by air-pressure, through the pipe O into the clarifying-tank N, the said pipe opening out near the bottom thereof. P is a cover floating on the surface of the liquid mass. The same is guided by rollers and guide-bars, so that it may rise and descend with very little play between the walls of the tank and along the pipe O. If preferred, this pipe may be arranged outside of the tank, as shown in dotted lines at O'. When the solid parts contained in the liquid have settled, which will have taken place after the lapse of several days, the clear part of the liquid is drawn off by the pipe Q and brought into the distilling apparatus, while the sediment is discharged by the valve R, in order to be converted into dry manure or poudrette. The bottom of the tank is sufficiently inclined that the sediment may completely run off. For the purpose of cleaning the tank, the cover P is suspended in suitable manner and the man-hole S opened so as to render the inside of the tank accessible. The clarifying-tanks hitherto used for the same purpose, possess the disadvantage that the feed-pipe does not open out near the bottom thereof, and that in consequence the fresh liquid while flowing in, troubles the liquid already contained in the tank, and which may have been partly clarified, the time for filling, which in tanks of a capacity of from twenty-five to thirty cubic meters generally amounts to about a day, being thus lost for the clarifying process. Moreover, the clarifying tanks hitherto employed are either open or entirely closed, and in the latter case they are provided with a ventilating pipe leading to a chimney or to a furnace. If from any reason an interruption in the working takes place, and the liquid in consequence remains for several days in the tank, the defecating materials lose their efficiency, and sulphureted hydrogen gas is disengaged. When the tanks are open, an offensive smell is caused hereby, while in closed tanks a gas-mixture is formed, which may easily give rise to an explosion. These disadvantages are completely obviated in the clarifying-tank with floating cover, as the said cover prevents the liquid from coming in contact with the air, and precludes the formation of explosive gas.

The heating of the distilling-vessels may be brought about not only by direct introduction of steam, but also by admission of steam into a coil of pipes arranged in the vessels, or by a combination of both systems. Moreover, the said vessels may be heated by direct fire or by the combustion-gases from a boiler-furnace. In the latter case the vessels are surrounded by brick-work containing appropriate flues, while the pipes $k$, $l$, $r$, and $q$, are so arranged that they will be outside of the flues. These different systems of heating being, however, not new, it has been considered unnecessary to show their application by drawing. If the distilling-vessels are to be heated by hot air, this may be done in the following manner: By means of an injector the products of combustion of a boiler or other furnace are aspired and introduced through pipes into the distilling-vessels, or air having previously passed through a system of pipes heated by fire-gases is forced by the injector into the vessels. By this mode of heating the disadvantage connected with direct heating by steam, and consisting in the dilution by the condensed steam of the liquid to be distilled, is obviated. Besides, the passage of the air through the liquid promotes the disengagement of the ammonia, and in case of the direct introduction of the products of combustion from a furnace the ammonia resulting from the combustion of the coals is conducted into the distilling apparatus, and thus finally obtained as salt of ammonia in the acid-tank.

In case fine white sulphate of ammonia, or sal-ammoniac, or pure liquor of ammonia is to be prepared, I make the following modifications in the described apparatus: The condensers D D', together with their receivers E E', Fig. 8, are not placed on the distilling-vessels A and B, but on special frames, and they are not heated. The rectifier F is at the same time omitted. If, besides, the number of systems D E is increased, the possibility is given of producing an ammoniacal gas which is free from impurities mechanically mixed therewith, (such impurities being especially troublesome in the extraction of ammonia from fecal matter,) and of obtaining in the absorbing-vessels a very pure final product. The ammoniacal liquor collecting in the receivers E' E, &c., will in every following receiver be more concentrated and contain less impurities mechanically mixed therewith than in the preceding one. According to its degree of concentration and purity, this liquor will have to be again passed through the apparatus for repeated distillation, or it is filtered, and thereupon saturated by acid.

The advantages which the described apparatus possess over those at present in use for the same purpose are the following:

First. By the system of narrow straight tubes such as are used for the dephlegmators and condensers shown by Figs. 1, 6, 7, and 8 the vapors are cooled in a better manner than by a single wide tube. Moreover, the narrow tubes present facilities in lining them with lead, which, when the tubes are made of iron, is necessary for the purpose of protecting them against corrosion by the hydrous ammonia. The narrow tubes may be lined simply by inserting a tube of lead, whereas in wide tubes sheet-lead has to be attached to the walls of the tube by screws, which is difficult as well as expensive. Besides, the vertical position of the tubes is in this respect more favorable than the horizontal arrangement. Moreover, the sediments collecting in the condenser act less prejudicially upon the condensation when a number of narrow tubes are used than when there is but a single wide tube. By employment of the mud-collector I sediments formed in the condenser may settle in a place where they can do no harm, and, besides, they may be drawn off during the working. When the tubes are placed vertically, as in the condensers, Fig. 8, a deposit of mud will never be formed upon the whole length of the tubes, and the sediment collecting at the bottom may be removed by means of suitable cocks without interrupting the process. The same is the case in respect to sediments in the dephlegmator. With the dephlegmators and condensers designed as shown in Figs. 1, 6, 7, and 8 it is much more rarely necessary to put the apparatus out of operation for the purpose of cleaning them of deposits than with those at present in use. The new apparatus are in consequence far more efficient than the latter.

Second. By means of the bell-shaped branches $c\ c'$, Figs. 1, 6, 7, 8, the ammonia may be expelled much more easily from the liquor contained in the distilling-vessels A and B, and the collecting-vessel H', and the liquor agitated more thoroughly than is the case with the devices used at present, which are even more expensive. Besides, the bells $c\ c'$ may be covered with lead, in order to protect them against corrosion, in a simpler, cheaper, and more durable manner.

Third. By the arrangement according to which the vapors of ammonia and the ammoniacal liquor are conveyed from the condenser in separate pipes (see Figs. 1, 6, 7) to the acid-tank and to the receiver E, respectively, the advantage over other apparatus for the same purpose is attained that the ammoniacal vapors arrive in dryer state in the acid-tank, and that, when from any cause much ammoniacal liquor collects during the working in the receiver, this liquor can never run over into the acid-tank, as frequently happens in apparatus in which the gas-pipe does not lead directly from the condenser but from the receiver to the acid-tank. This advantage is attained in a still higher degree by the arrangement, Fig. 8.

Fourth. By the peculiar connection of the dephlegmator C with the collecting-vessel H' and by the bells $c'$, Figs. 7 and 8, arranged within the latter the advantage is attained over other apparatus also working with continuous feed that the collecting-vessel is at the same time a distilling-vessel, so that the liquor entering into the apparatus at once participates in the distillation. The time for distilling a charge is thereby shortened. Another advantage of this arrangement is, that in measure as the working of a charge draws toward its close, and the aqueous vapors issuing from the vessel B increase, the dephlegmating action of the liquid collecting in greater quantity in the vessel H' will also increase.

Fifth. The centrifugal disperser represented in Fig. 9, in combination with the collecting-vessel H' and the dephlegmator C, and which has hitherto only been used in the production of spirit, fulfills on one hand the same purpose as in the latter case, while on the other hand its object is to assist in the purification of the material to be worked. When, for instance, ammonia is to be obtained from fecal matter, a substance is to be dealt with which, even after having been clarified in tanks such as shown by Fig. 15, still contains impurities mechanically mixed therewith. These impurities being carried along during the distillation in considerable quantity by the aqueous vapors, and finally conveyed into the acid-tank, give rise to extensive pollutions of the ammoniacal salts to be obtained. By means of the centrifugal disperser the said impurities may for the greater part be precipitated. When the vapors rising from the collecting-vessel H' pass the film of liquor spread out by the centrifugal apparatus, the impurities in suspense are retained and washed by the descending liquid back into the collecting-vessel. The films of liquid produced by the centrifugal apparatus thus act upon the said impurities in the manner of a filtering medium. Besides, the apparatus shown by Fig. 9 presents an essential improvement in comparison to former forms thereof employed in spirit-distilleries, inasmuch as the filling or conducting plates $v$ prevent the rising vapors from remaining stationary at any point and impurities from being deposited upon the walls of the apparatus.

Sixth. The liquor-heaters represented by Figs. 10 to 14 possess over other apparatus of the kind the advantage that they are less liable to become choked by sediments, that they may be cleaned quicker and more easily during the working, and that they are carried out fully upon the principle of counter-currents. Moreover, in the apparatus, Figs. 10, 11 and 13, 14, the liquor to be heated has a motion directed upward with considerable rise, so that nowhere air or gas can accumulate, and that consequently deposits of carbonate of ammonia, which would impede the flow of liquid through the pipes, cannot be formed. The spent liquor coming from the vessel L, and which carries with it a considerable amount of finely-divided particles of lime, runs off with considerable fall through the heater. Besides, mud-holes are provided for, through which deposits of lime may be speedily removed. In the construction, Figs. 13 and 14, for instance, deposits may settle at the points 1 2 3 without choking the pipes $y'\ y^2\ y^3$. By mud-holes in the side walls of the compartments these deposits can be quickly removed.

Seventh. The advantage of the clarifying-tank, Fig. 15, consists in the complete separation of the liquid from the outer air. No evaporation of the liquid can, therefore, take place, and no explosive gases can form above the same.

In the arrangement of Fig. 15 the level to which the clarified liquid can be drawn off depends upon the position of the cocks connecting the pipe Q with the tank. In case the clarified liquid has its margin at a point between two cocks, it can of course be drawn off only by the upper one of them. If it be desired, however, to draw off the whole quantity of clear liquor, this may be done by means of an india-rubber tube fixed into the floating cover P so as to project about half an inch from its under side, and conducted over the rim of the tank to the vessel into which the liquid is to be discharged. The tube and the floating cover then form a siphon, by which the liquid may be drawn off to the very surface of the sediment. By a cock attached to the tube the discharge may be controlled.

I claim as my invention—

1. In a distilling apparatus for ammonia, the dephlegmator C and a condenser, D, consisting of a system of narrow pipes within which vapors are condensed by the liquor to be worked and which surrounds the tubes, substantially as specified.

2. The combination of the distilling apparatus, the dephlegmator C, and the condenser receiving the liquor to be worked, provided with pipes for passage of the vapors and with a mud-collector, I, as and for the purposes hereinbefore set forth.

3. The combination, with the dephlegmator C, of a condenser, D, for ammoniacal vapors, comprising a number of narrow upright tubes communicating at their lower ends with a receiver, E, which receives the vapors and the liquid of condensation, and is provided with separate and distinct outlets for the escape of the vapor and liquid, respectively, as described, and shown in Fig. 8 of the accompanying drawings.

4. The combination, with the distilling apparatus, of a collecting-vessel, H, receiving liquor to be worked from the dephlegmator, substantially as set forth.

5. In the described apparatus, the combination of the collecting and distilling vessel H′, the dephlegmator C, and the centrifugal disperser K, substantially as and for the purpose set forth.

6. The liquor-heater connected with and receiving from the distilling apparatus the liquor drawn off therefrom, and provided with conduits communicating with the distilling apparatus and the source of supply of the liquor to be worked, the arrangement being such that the liquor to be worked is conducted upward through the heater, in order to prevent accumulation of air or gases, as hereinbefore set forth.

7. The combination of the distilling apparatus and the clarifying-tank provided with the floating cover P and means for drawing off the clarified liquid, as and for the purposes hereinbefore set forth.

In testimony whereof I have signed my name to this specification in the presence of two subscribing witnesses.

CARL HEINRICH SCHNEIDER.

Witnesses:
 B. ROI,
 AREPIEPER.